(No Model.)
J. M. LENIX & G. B. SWANN.
BRACE FOR BEDSTEADS, GATES, &c.
No. 364,027. Patented May 31, 1887.
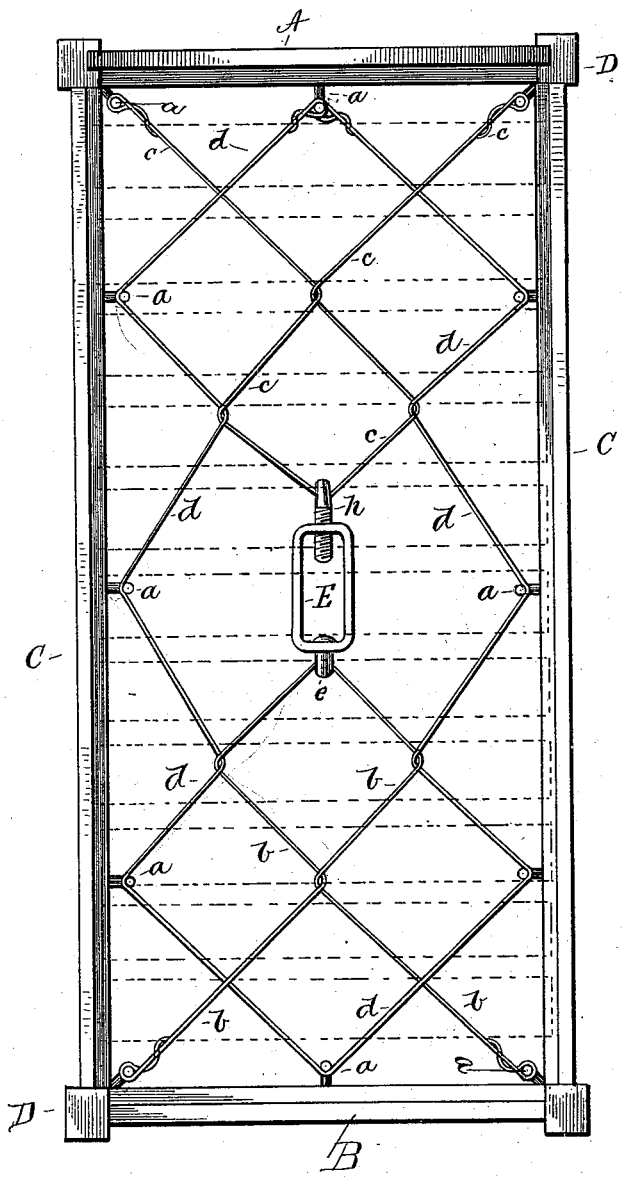

United States Patent Office.

JOHN M. LENIX AND GEORGE B. SWANN, OF NORTON, TEXAS.

BRACE FOR BEDSTEADS, GATES, &c.

SPECIFICATION forming part of Letters Patent No. 364,027, dated May 31, 1887.

Application filed September 27, 1886. Serial No. 214,602. (No model.)

*To all whom it may concern:*

Be it known that we, JOHN M. LENIX and GEORGE B. SWANN, citizens of the United States, residing at Norton, in the county of Grayson and State of Texas, have invented certain new and useful Improvements in Braces for Bedsteads, Gates, &c.; and we do hereby declare the following to be a full, clear, and exact description of the invention, such as will enable others skilled in the art to which it appertains to make and use the same.

This invention relates to braces for bedsteads, gates, and any frame having four sides which it is desired to hold rigidly together against strain; and it has for its object to produce an effective brace which will consist of but few parts, and those very simple; and it consists of the parts and combinations of parts hereinafter described and claimed.

In the accompanying drawing, forming a part of this specification, the figure represents a plan view of the brace applied to a bedstead, the dotted lines thereon indicating the slats.

A represents the head-board, B the foot-board, C the side rails, and D the posts, of an ordinary bedstead, the head-board, foot-board, and rails being mortised or otherwise secured to the bed-posts in any desired manner.

At each corner of the bedstead or frame to be braced, and at the center of the ends, and at suitable intervals apart along the inside of the rails, small screw eyes or hooks, $a$, are driven, the number thereof being according to the length and width of the frame to be braced. The brace itself consists of the long wire $d$ and the two short wires $b$ $c$, the swivel nut or link E, the headed eyebolt $e$, and the screw-eyebolt $h$, the former being passed through an opening in one end of the nut or link and its end tapped, so that it may work loosely therein, and the latter being fitted to a screw-threaded perforation in the opposite end of the link or nut. One end of the short wire $b$ is secured to the hook or eye in one of the posts and its other end passed through the eyebolt $e$, and is then brought back and secured to the hook or eye in the opposite post at the same end of the frame, after having first been given one half turn or twist around the other half of the wire at about its center. The wire $c$ is passed through the screw-bolt $h$, given a twist or half-turn, and fastened to the hooks or eyes in the opposite end of the frame in the same manner as wire $b$. One end of the wire $d$ is secured to one of the center hooks or eyes, $a$, and then led to the first hook in the side rail, C, and then given a half twist or turn around the wire $c$ midway between the screw-bolt $h$ and the twist in the wire $c$, thence it is brought around or through the next hook or eye in the rail, and is led from there around the wire $b$, and thence to the next hook or eye in the rail, and so on until the wire $d$ is brought back to and firmly secured to the center hook or eye, $a$, from where it started.

It will be readily understood from the above description and the drawing that upon twisting the nut E in one direction the screw-bolt $h$ will be screwed in and the wires $b$ and $c$ will be stretched or drawn toward the center, thus taking up the slack in and tightening the wire $d$ by drawing it inward from both sides, and thus preventing the frame springing or tightening the same after it has become loose, while if a reverse movement is given the nut the wires will all be slackened, and may easily be removed to take the frame apart when desired. Thus it will be seen that we produce a very simple brace, which consists of but three wires and a swivel-nut and attachments, which will hold together the frame of a bed or gate with great firmness.

We are aware that two twisted wires having a headed and screw-threaded rod interposed between their strands have been secured to the head and foot posts of a bedstead on each side thereof, and other wires led from eyes in the side rails and head and foot boards to and about the first-named wires, and we do not, therefore, claim such invention.

Having thus described our invention, what we claim as new, and desire to secure by Letters Patent, is—

The combination, in a brace for bedsteads, &c., of the posts D, having the hooks or eyes $a$, the head-board, foot-board, and rails, also provided with hooks or eyes, the swivel E, the wires $b$ $c$, each having one end secured to one of the corner hooks or eyes, passed through the eyebolt $e$ and screw-bolt $h$, respectively, and given a half-turn on themselves, and their other ends secured to the opposite corner hooks, and the wire $d$, having one end secured to one of the center hooks or eyes and woven in and out over the hooks or eyes in the rails and around the wires $b$ $c$, back to said center hook, where it is secured, substantially as set forth.

In testimony whereof we affix our signatures in presence of two witnesses.

JOHN M. LENIX.
GEORGE B. SWANN.

Witnesses:
D. EDWARD EMERSON,
HENRY C. BITTING.